United States Patent
Griffin et al.

(10) Patent No.: US 12,328,231 B2
(45) Date of Patent: Jun. 10, 2025

(54) CONSENSUS DRIVEN MESH ORGANIZATION

(71) Applicant: Red Hat, Inc., Raleigh, NC (US)

(72) Inventors: Leigh Griffin, Waterford (IE); Pierre-Yves Chibon, Saint-Pol-de-Léon (FR)

(73) Assignee: Red Hat, Inc., Raleigh, NC (US)

( * ) Notice: Subject to any disclaimer, the term of this patent is extended or adjusted under 35 U.S.C. 154(b) by 519 days.

(21) Appl. No.: 17/667,284

(22) Filed: Feb. 8, 2022

(65) Prior Publication Data
US 2023/0254216 A1    Aug. 10, 2023

(51) Int. Cl.
*H04L 41/12* (2022.01)
*H04L 43/10* (2022.01)

(52) U.S. Cl.
CPC .............. *H04L 41/12* (2013.01); *H04L 43/10* (2013.01)

(58) Field of Classification Search
CPC ......... H04L 41/12; H04L 43/10; H04L 67/51; H04L 67/55; H04L 41/5012; H04L 43/103; H04L 43/55; H04L 67/125; H04L 67/10; H04L 67/104; H04L 67/1042; H04W 88/18; H04W 84/18
See application file for complete search history.

(56) References Cited

U.S. PATENT DOCUMENTS

| | | | |
|---|---|---|---|
| 7,451,221 B2 | 11/2008 | Basani et al. | |
| 8,583,958 B2 | 11/2013 | Surkov | |
| 10,367,676 B1 | 7/2019 | Vermeulen et al. | |
| 10,448,454 B1* | 10/2019 | Tao | H04L 67/51 |
| 10,642,507 B2 | 5/2020 | Gupta et al. | |
| 10,749,954 B2 | 8/2020 | Chen et al. | |
| 2013/0155841 A1* | 6/2013 | Engebretsen | H04L 41/12 |
| | | | 370/389 |
| 2015/0180750 A1* | 6/2015 | LaPlante | H04L 43/0817 |
| | | | 709/224 |
| 2017/0374516 A1* | 12/2017 | Huo | H04W 4/023 |
| 2021/0042160 A1* | 2/2021 | Alamouti | G06N 5/022 |
| 2023/0291812 A1* | 9/2023 | Roth | H04W 4/02 |

OTHER PUBLICATIONS

Zhang, Yang, et al., "When Raft Meets SDN: How to Elect a Leader and Reach Consensus in an Unruly Network," APNet'17, Aug. 3-4, 2017, Hong Kong, China, 7 pages.
Yagoub, Mudathir F. S., et al., "Lightweight and Efficient Dynamic Cluster Head Election Routing Protocol for Wireless Sensor Networks," Sensors 2021, 21, 5206, 24 pages.
Feng, Tao, et al., "Consensus-based Robust Clustering and Leader Election Algorithm for homogeneous UAV clusters," IOP Conf. Series: Journal of Physics: Conf. Series 1168 (2019) 032073, 11 pages.

* cited by examiner

*Primary Examiner* — Ricky Q Ngo
*Assistant Examiner* — David M Kayal
(74) *Attorney, Agent, or Firm* — Womble Bond Dickinson (US) LLP (57) ABSTRACT

Processing logic may determine that a service is absent among a plurality of nodes within a zone of a mesh network. Processing logic may nominate one of the plurality of nodes to run the service. Processing logic may request a consensus among the plurality of nodes within the zone of the mesh network to confirm the nomination. Processing logic may, in response to receiving confirmation of the nomination by the plurality of nodes in the zone of the mesh network, push the service to the one of the plurality of nodes to run the service.

14 Claims, 5 Drawing Sheets

CONSENSUS DRIVEN MESH ORGANIZATION

TECHNICAL FIELD

Aspects of the present disclosure relate to managing services run by nodes in a mesh network, and more particularly, to a consensus driven process which nominates a node to run a given service.

BACKGROUND

Computing devices may execute instructions that are grouped together as a computer program to perform one or more actions. Computing devices may be communicatively coupled to each other over a network, which may include electrical or optical wiring, wireless radio-frequency transceivers, or other network infrastructure. The computing devices may communicate with each other using various communication protocols.

Computing devices may include smartphones, sensors, appliances, cameras, power systems, heating systems, utility lines, printers, and other devices. Each device may generate, process, receive and transmit data on the network. Networks may have topologies that vary in how nodes in the network are interconnected, and how each node ultimately connects to the internet.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Smart devices, sensors, homes, and other systems are prevalent in the environment. Given the large number of such components that are present in a given environment, and the large amount of data communicated between these components, it is desirable that such components communicate with each other in a manner that leverages group capabilities, reduces redundancies in hardware, reduces processing overhead, optimizes communication throughput, or a combination thereof. A mesh network topology organizes device-to-device communication with such benefits in mind.

With mesh networking, components such as internet of things (IoT) devices may leverage communication with each other to operate more efficiently and reduce hardware and processing overhead when the components are considered as a whole. A mesh network may include multiple interconnected components which may be referred to as nodes. Each node may be a computing device such as an IoT device, a mobile phone, a sensor, an appliance, a heating or cooling system, a security system, a camera, or other computing device. These computing devices may not all have Wi-Fi capabilities, due to limited power, compute resources, or hardware resources. With a mesh network, the nodes may communicate with each other wirelessly, and pool their resources to then connect to the internet (e.g., through a single point). Data packets may be routed between nodes on the mesh network. Nodes may piggyback off each other to extend a radio signal (such as a Wi-Fi or cellular signal) and route, relay, and proxy traffic to and from clients. Each node within a mesh network may spread the radio signal a little further than the last, thus minimizing the possibility of dead zones. Additionally, every node in a mesh network may have more than one way to send and receive information. Given that a mesh network has a decentralized topology, nodes can pass data through various routes to get it to the destination. As a result, the mesh network does not have a single point of failure, thus increasing the reliability of connectivity for each node within the mesh. In some mesh networks, each node may broadcast data, in what may be understood as a 'flooding' process. In some mesh networks, data traffic may be routed by each node in a certain path that is determined based on an algorithm (e.g., Shortest Path Bridging (SPB) or another self-healing algorithm). The mesh network may include one or more gateway nodes to communicate with the internet.

In a mesh network, each of the devices may offer services. Those services are important to geographical grouping of nodes (e.g., zones) where the presence of multiple services may provide a suite of functionality. Further, each node may migrate from one zone of a mesh network to another zone of a mesh network. For example, a first zone may have geographical borders that represent a living room. A second zone may have geographical borders that represent a bedroom. If a user picks up a node and moves it from the living room to the bedroom, the node has migrated from one zone to another. With such a migration goes the service or services that the node previously offered to its neighboring nodes. In this case, some service gaps (e.g., services offered by the migrating node) may form in the living room, as a result of the migration. Thus, there is a problem of how to allocate services within a zone of a mesh network such as when a service is absent in a zone of a mesh network. If the service gap is not filled, then nodes in the living room may access nodes outside of the living room (e.g., nodes in the garage or in the bedroom) for that service. As the distances between nodes in a mesh network grows, so does the load on the network grow when a node access a service from another node. Thus, it is desirable for nodes to access services from neighboring nodes (e.g., in the same zone).

In conventional systems, allocation of services within a mesh network may rely on input from a systems administrator or nodes may refer to a static lookup table to determine which nodes are to perform which service. Such systems, however, may not dynamically adjust to different conditions and location of nodes in the mesh network on a zone-by-zone basis. Further, such systems do not take input from multiple nodes within the network, and may assign services to nodes without regard to the current service capabilities within a given zone of a mesh network. As such, services offered by nodes may become redundant within a given zone of a mesh network, or may be absent within a given zone of the mesh network. If the service is absent within a given zone, the nodes within that zone may access a node that is out of that zone, thus increasing traffic within the mesh network. Further, that node that does provide the service may become overloaded due to the many nodes within the mesh network trying to use the service.

Aspects of the disclosure address the above-noted issues and other deficiencies by processing logic that may dynamically manage services among nodes within a zone of a mesh network, in a consensus driven manner. In one aspect, processing logic may determine that a service is absent among a plurality of nodes within a zone of a mesh network. Processing logic may nominate one of the plurality of nodes to run the service. Processing logic may request a consensus among the plurality of nodes within the zone of the mesh network to confirm the nomination. Processing logic may, in response to receiving confirmation of the nomination by the plurality of nodes in the zone of the mesh network, push the service to the one of the plurality of nodes to run the service.

In such a manner, management of services may be performed on a per-zone basis, to reduce service gaps within each zone. Nodes will then be less likely to access a node outside of its zone for a given service, which may reduce bandwidth of the mesh network and balance workload among nodes. Further, by initiating a consensus among nodes of a zone, the node-service nomination process is spread between the nodes and each node may keep its own table of which node performs which service in that zone.

Processing logic may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. Processing logic may be integral to any of the nodes in a mesh network.

Figure 1:
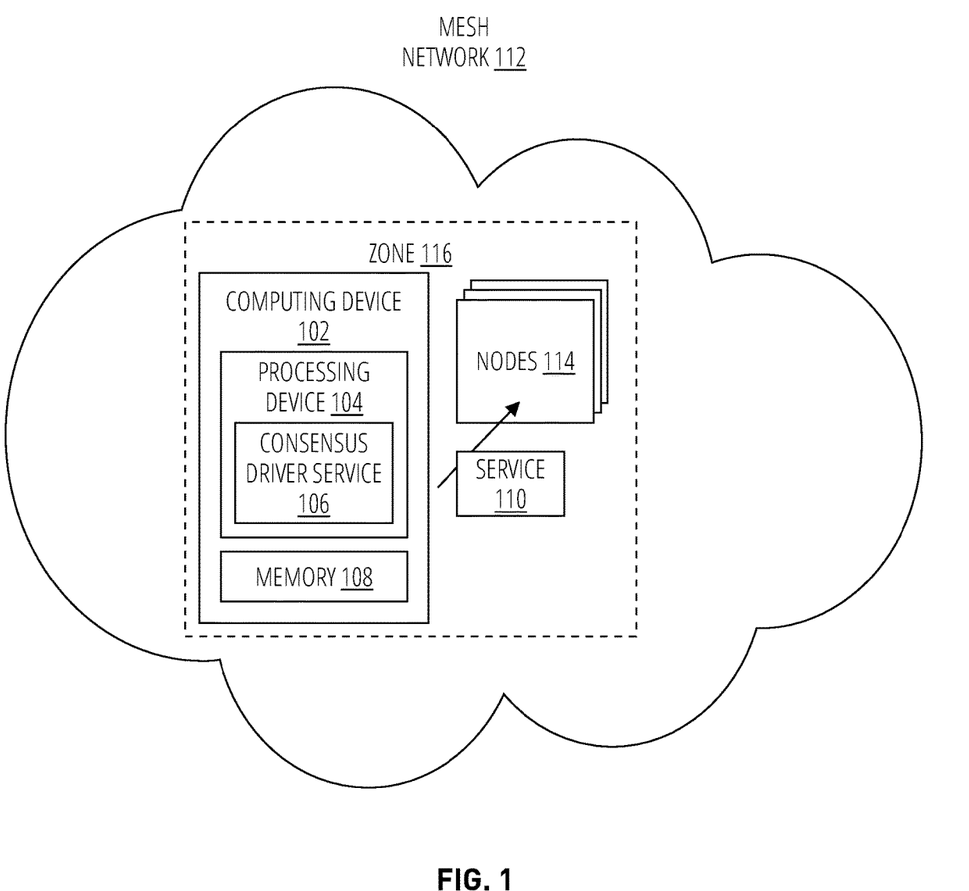
FIG. 1 shows a block diagram of a computing device that may assign a service to one of one or more nodes in a mesh network, in accordance with some embodiments.

FIG. 1 shows a block diagram of a computing device 102 that may assign a service 110 to one of one or more nodes 114, in accordance with some embodiments. Computing device 102 includes a processing device 104 and a memory 108. Memory 108 may include volatile memory devices (e.g., random access memory (RAM)), non-volatile memory devices (e.g., flash memory) and/or other types of memory devices. Computing device 102 may be a node within mesh network 112, such as included as one of nodes 114. Further, each of nodes 114 may be a computing device. Computing device 102 may include processing logic such as processing device 104.

The mesh network 112 may have one or more zones such as zone 116. Each zone may have a geographic boundary such that when a node leaves that geographic boundary, it exits that zone and enters another zone. As discussed, zones may delineate regions of a given space, for example, a first zone may represent a living room, a second zone may represent a kitchen, a third zone may represent a garage, and so on. Nodes 114 may include geofencing algorithms that determine location of itself or other nodes within the mesh network.

Processing device 104 includes a consensus driver service 106. Consensus driver service 106 may monitor the services offered by each of the nodes 114 that are present in a given zone 116 of a mesh network 112. If the consensus driver service 106 determines that service 110 is absent (e.g., not being offered by any of nodes 114, then the consensus driver service 106 may nominate any of the nodes in zone 116 such as nodes 114 or itself, to offer the absent service 110. Additionally, or alternatively, the consensus driver service 106 may nominate any of the nodes in zone 116 to drop a service, or to offer service 110 even if it is already being offered in the zone 116. For example, consensus driver service 106 may determine that one of the nodes is overloaded or that a different node in zone 116 is a better fit to run service 110 than the node currently running service 110, as described in other sections.

The consensus driver service 106 may request that the plurality of nodes in the zone confirm this nomination. The plurality of nodes may each confirm this nomination, or disagree with this nomination. If a threshold number or percentage of nodes agree, then the consensus driver service 106 may push this service 110 to the nominated node. If the nomination is not confirmed by the threshold, then consensus is not reached and the consensus driver service 106 does not push the service to the nominated node.

In some examples, the consensus driver service may ensure that a single instance of a core service is offered in zone 116, rather than none or more than one. If more than one core service is present per zone, this may be unnecessarily redundant and result in computational waste. If none are present in a zone, then nodes in the zone may access the service in other zones, which may result in an unwanted increase in network traffic. Further, that node providing the access may come under an increased load due to servicing a larger number of nodes—nodes in its zone and nodes from another zone.

As such, the consensus driver service 106 may dynamically manage services that are offered in a given zone, to identify and fill service gaps within the zone. Traffic from one zone to another may be reduced, thereby reducing the load on the mesh network 112, and reducing risk that a single node is left to provide a service for the entire mesh network. Further, each of the respective nodes of a given zone may weigh in on whether or not a particular node (e.g., the nominated node) in that zone should become the provider of service 110. The participating nodes may record which service is provided by each node, without a central broadcast of such a table to all nodes, further reducing network traffic in the mesh network 112.

Figure 2:
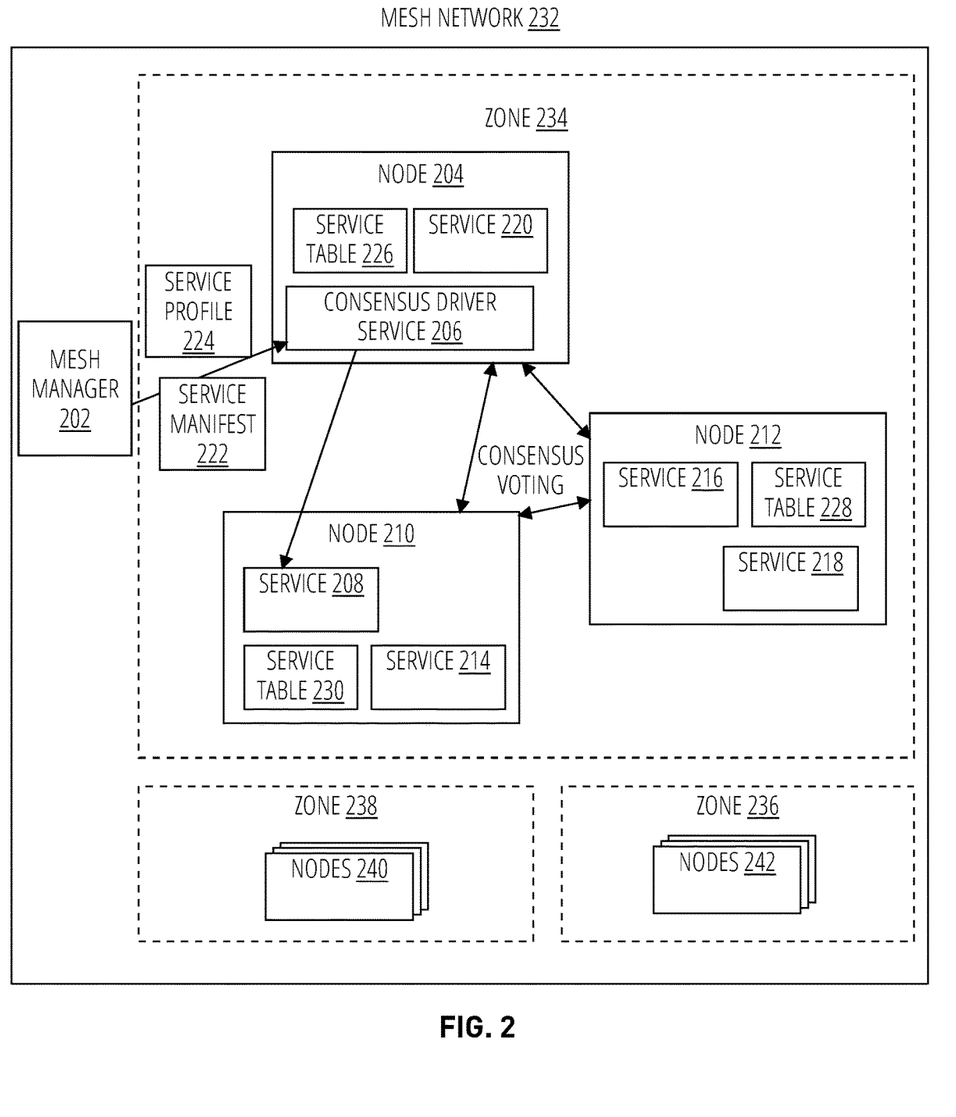
FIG. 2 shows an example of a mesh network with a consensus driven service nomination, in accordance with some aspects.

FIG. 2 shows an example of a mesh network 232 with a consensus driven service nomination, in accordance with some aspects. Mesh network 232 includes a plurality of zones such as zone 234, zone 238, and zone 236.

Each zone may be delineated by geographic boundaries. These geographic boundaries may be enforced by each of the nodes in the zone. For example, each node may perform geofencing operations to define geographical boundaries of interest. When a node moves, it may sense that it has crossed a boundary. Additionally, or alternatively, a node may poll neighboring nodes to determine a geographical position of the node. Additionally, or alternatively, a node may use GPS or other geofencing algorithm to determine its geographical position. When a node enters a zone, it may associate itself with its neighboring nodes, which are the nodes that are also in that zone.

Each node in the mesh network 232 may be capable of running one or more services, including a consensus driver service 206 that manages service offerings within a given zone. A mesh manager 202 may elect a node to be run the consensus driver service 206 for each zone. In some aspects, the mesh manager 202 elects a node to run as a central consensus driver service 206, and nodes in other zones may be elected by the mesh manager 202 or the central consensus driver service, in a federated manner. For example, zone 238 and zone 236 each have respective nodes 240 and nodes 242. Further, in each of these zones, one of the nodes may be running a respective consensus driver service. As such, services are managed local to each zone using a consensus driven process.

The consensus driver service 206 may determine that a service is absent among a plurality of nodes within a zone of a mesh network. For example, consensus driver service 206 may poll each of the nodes 210 and 212 in its zone 234 to request information regarding which service is currently running on that node. Based on the response from each of nodes 210 and 212, the consensus driver service 206 may determine that service 208 is absent in the zone 234, because none of the nodes in that zone are offering service 208. In response, the consensus driver service 206 may nominate one of the plurality of nodes such as node 210 to run the service.

The consensus driver service 206 may request consensus among the plurality of nodes within the zone of the mesh network to confirm the nomination. For example, node 204, node 210, and node 212 may each determine whether or not node 210 is to run service 208. Node 210 may agree and share this confirmation with node 204, node 212, or both. Similarly, node 212 may agree that node 210 is a proper nomination to run service 208, and communicate this confirmation to node 210, node 204, or both. Given that node 204 nominated node 210, it need not confirm this nomination.

In response to receiving confirmation of the nomination by the plurality of nodes in the zone of the mesh network, the consensus driver service 206 may push the service 208 to the one of the plurality of nodes to run the service. For example, the consensus driver service 206 may provide instructions to node 210 to run and offer service 208. This may include instructions to run service 208, to download the service 208, an address to download the service 208, or other information to help node 210 obtain or run service 208.

In some aspects, the service 208 may be accessible to all nodes within the zone 234 and to all nodes within the mesh network 232. As shown, the mesh network 232 may include a plurality of zones such as zones 234, 238 and 236. Each zone may have a geographical boundary within the mesh network, and each of the plurality of nodes within each zone may be configured to prioritize accessing local services that are offered within the zone of the respective node.

In some aspects, the consensus driver service 206 may determine that the service 208 is not present within the zone of the mesh network by comparing a service manifest 222 that includes a list of expected services within the zone, to a list of services that are currently running on the plurality of nodes within the zone.

For example, node 204 may poll each of the nodes to determine that node 210 is offering service 214, and that node 212 is offering service 216 and service 218. Further, node 204 is aware that it is offering service 220. Node 204 may keep a record of all these services that are offered in the zone 234 in service table 226. The polling may be performed periodically, and the service table 226 may be updated by the consensus driver service 206 to keep record of the current services offered by each node within the zone 234.

In some aspects, service manifest 222 may include core services that are to be offered in each zone. These core services may include basic functionality that nodes use for a variety of other tasks such as authentication, downloading, or other core services.

The consensus driver service 206 may nominate the one of the plurality of nodes (e.g., node 210) to provide the service 208 based on one or more criteria of the node, such as, for example, network throughput, CPU load, a number of services run by the node, or RAM availability. For example, the consensus driver service 206 may poll each of the nodes within zone 234 to obtain such criteria from each node. In some aspects, the consensus driver service 206 may compare the one or more criteria of each of the plurality of nodes within the zone of the mesh network to a service profile 224 that is associated with the service 208. The consensus driver service may nominate the node based on which of the one or more criteria best fits with the service profile 224 of the absent service 208.

For example, a service profile 224 of service 208 may specify a desired network throughput, CPU load, RAM availability, or other criteria. The consensus driver service 206 may determine that node 210 has these matching criteria, or be the closest among the nodes to this profile. As such, node 204 may nominate node 210 to run and offer this service.

Additionally, or alternatively, consensus driver service 206 may nominate a node based on load. For example, node 204 and node 212 may be offering more services than node 210, or node 210 may have more CPU, RAM, or network throughput available than the other nodes in zone 234. Thus, the consensus driver service 206 may select node 210 based on having more available resources or less running services than the other nodes in the zone.

As discussed, each of the nodes in the zone such as node 210 and node 212 may confirm the nomination. This may be performed in the same manner in which the consensus driver service 206 nominated the node. For example, node 210 and node 212 may determine, based on the service profile 224 and the one or more criteria of each node, that node 210 has the one or more criteria that best fits the service profile compared to other nodes in the zone 234. Node 210 and node 212 may each communicate this confirmation with the other nodes in zone 234, including with the consensus driver service 206 of node 204. The consensus driver service 206 may push service 208 to node 210 in response to the consensus being reached. In some examples, every node need not agree, but a threshold amount (e.g., more than 'X' amount or percentage of nodes within the zone) may be sufficient to reach a consensus among the nodes in the zone.

In some examples, each of the nodes such as node 210 and node 212 may update a local service table (e.g., service table 230 and service table 228, respectively) to include that the one of the plurality of nodes is to run the service 208. In such a manner, each node within the zone will have knowledge of which node is running a given service in that zone. The consensus driver service 206 need not broadcast the service offerings within the zone 234, and the consensus driven process also serves to update each nodes service table.

Figure 3:
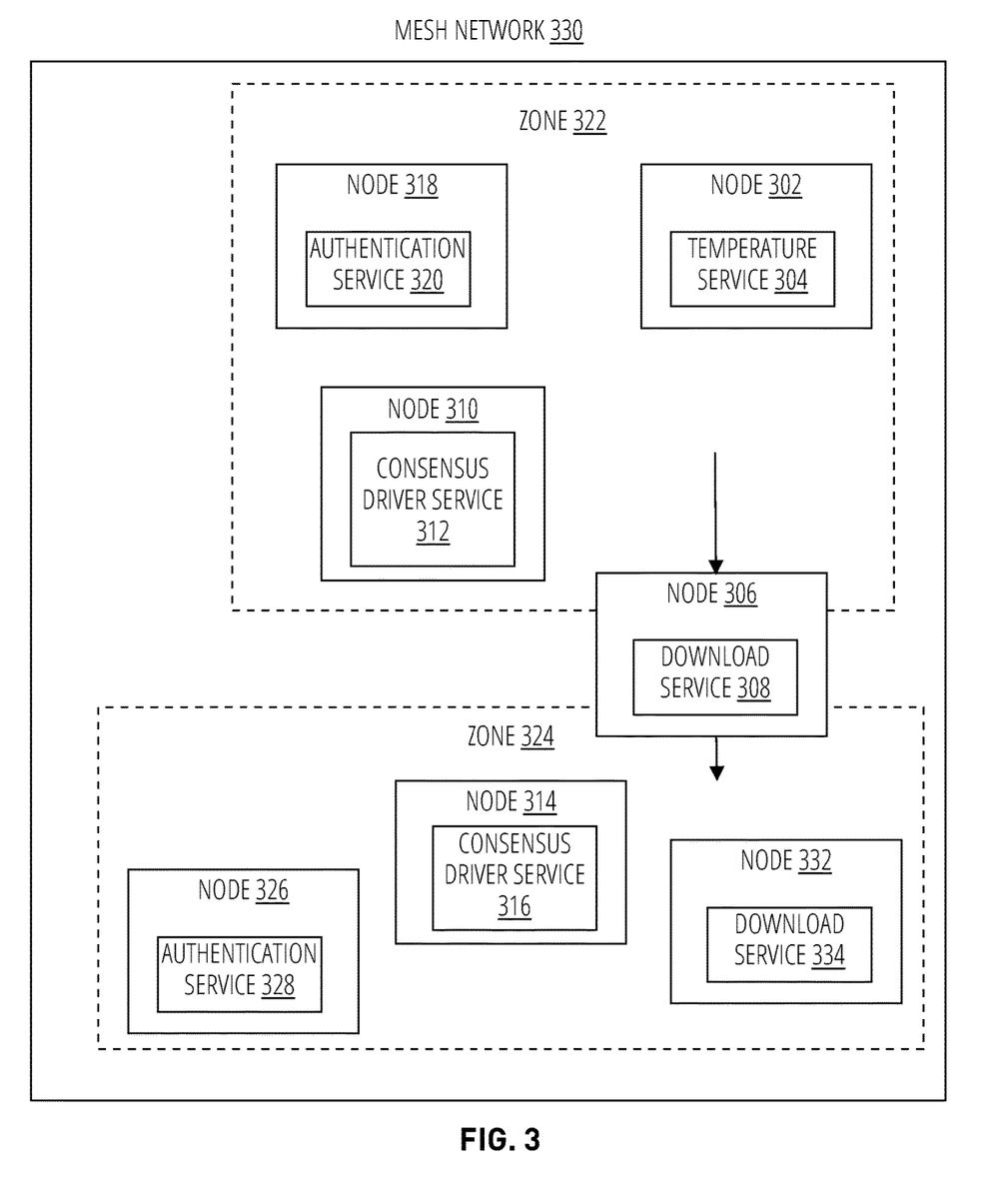
FIG. 3 shows an example mesh network with migration of a node, in accordance with some embodiments.

FIG. 3 shows an example mesh network 330 with migration of a node, in accordance with some embodiments. The mesh network 330 may include a plurality of zones such as zone 322 and zone 324. Each of the zones may have a node designated to run a consensus driver service. Zone 322 may have a node 310 that runs consensus driver service 312. Zone 324 may have a node 314 that runs consensus driver service 316. Each consensus driver service manages service offerings within its respective zone.

Each zone may have nodes that each run one or more services. For example, zone 322 may include a node 318 that runs an authentication service 320. Node 302 may run a temperature service 304, that senses and returns a temperature as sensed by node 302. Node 310 may be designated to run the consensus driver service 312. Similarly, in zone 324, node 326 may perform an authentication service 328. Node 314 may be designated to run the consensus driver service

316. Node 332 may run download service 334. Each of the services of each node, such as the authentication service, the download service, the temperature service, or other services, may be accessed by other nodes in the mesh network.

As discussed, nodes may migrate from one zone to another zone within a mesh network. For example, node 306 may be relocated by a user to zone 324. Consensus driver service 312 may determine that a service such as download service 308 is absent among the plurality of nodes within zone 322 of the mesh network 330. In response, the consensus driver service 312 may nominate another node such as node 318, node 302, or itself (node 310) to run and offer the download service. Once the consensus driver service 312 nominates one of the nodes in the zone, it may request a consensus among all of the nodes within the zone of the mesh network (e.g., node 302, and node 318) to confirm the nomination. Nodes outside of the zone (e.g., in zone 324 or another zone) may not join in the consensus.

In response to receiving confirmation of the nomination by the nodes in the zone of the mesh network, consensus driver service 312 may push the service to the one of the plurality of nodes to run the service. In some cases, if the consensus driver service 312 nominates itself, it may run and offer the service on node 310 if consensus is reached.

In some examples, the consensus driver service may fill a service gap when the absent service is a core service (e.g., an authentication service, a download service, or other core service) and not when the service is not core. Core services may be defined as a service that other nodes in the mesh network or a zone of the mesh network depend on to perform a given functionality. Core services may be set by a mesh manager (e.g., mesh manager 202) or other supervisory mesh network component.

As shown in this illustration, the consensus driver service 312 may nominate a node to provide an absent service (e.g., download service 308) in response to detecting that a node that previously offered the service (e.g., node 306) has left the zone. Thus, rather than have the nodes in zone 322 reach outside of the zone for a download service, a new node may offer the service within zone 322, thereby reducing network traffic and balancing loads within the mesh network 330.

Further, the consensus driver service may nominate a node to provide a service in response to a new node entering its zone within the mesh network. For example, node 306 may migrate to zone 324. Consensus driver service 316 may determine that node 306 has entered the zone 324. As a result, zone 324 has multiple nodes (node 306 and node 332) that provide the same service (e.g., download service 308 and download service 334). In response, consensus driver service 316 may reorganize the service offerings in zone 324 and nominate which of the nodes is a better fit to run and offer the download service in zone 324, as described in other sections. Further, the consensus driver service 316 may request consensus for the nomination of a node in zone 324. As discussed in other sections, the nodes in zone 324 may then agree or disagree with the nomination and communicate this confirmation to remaining nodes in the zone. When a consensus is reached, the consensus driver service 316 may ask either node 306 or node 332 to drop the download service, depending on which one of the nodes was selected to offer the service. For example, if node 306 is to run the download service, then the consensus driver service 316 may request node 332 to drop the download service.

In some examples, any of the consensus driver services may nominate a second of the plurality of nodes to provide a given service in response to a first of the plurality of nodes having a load that satisfies a threshold amount. For example, consensus driver service 312 may poll the nodes in zone 322 to obtain one or more criteria from each of the nodes. Consensus driver service 312 may note that node 318 has 'x' CPU usage, 'y' RAM available, 'z' network throughput, 'n' number of services currently running, or a combination thereof. Consensus driver service 312 may determine that such criteria is not suitable or is insufficient to continue to run authentication service 320. As such, if the current status of the node (e.g., node 318) satisfies a threshold, e.g., a predetermined CPU usage, RAM availability, current number of services running, or network throughput, then the consensus driver service 312 may nominate another node in zone 322 to run and offer the authentication service. This other node (e.g., node 302) may be a better fit for the service, given the status of this other node. For example, node 302 may have lower CPU usage or other criteria that makes it more suitable to run the authentication service. Similar to as described with respect to other nominations, the consensus driver service 312 may then request that the nodes in the zone 322 reach a consensus that node 302 should run the authentication service. If the consensus is reached, consensus driver service 312 may push the authentication service to the nominated node (e.g., node 302). Consensus driver service 312 may also notify node 318 to drop authentication service 320. As such, load balancing may be performed on a per-zone basis in a consensus driven manner.

Figure 4:
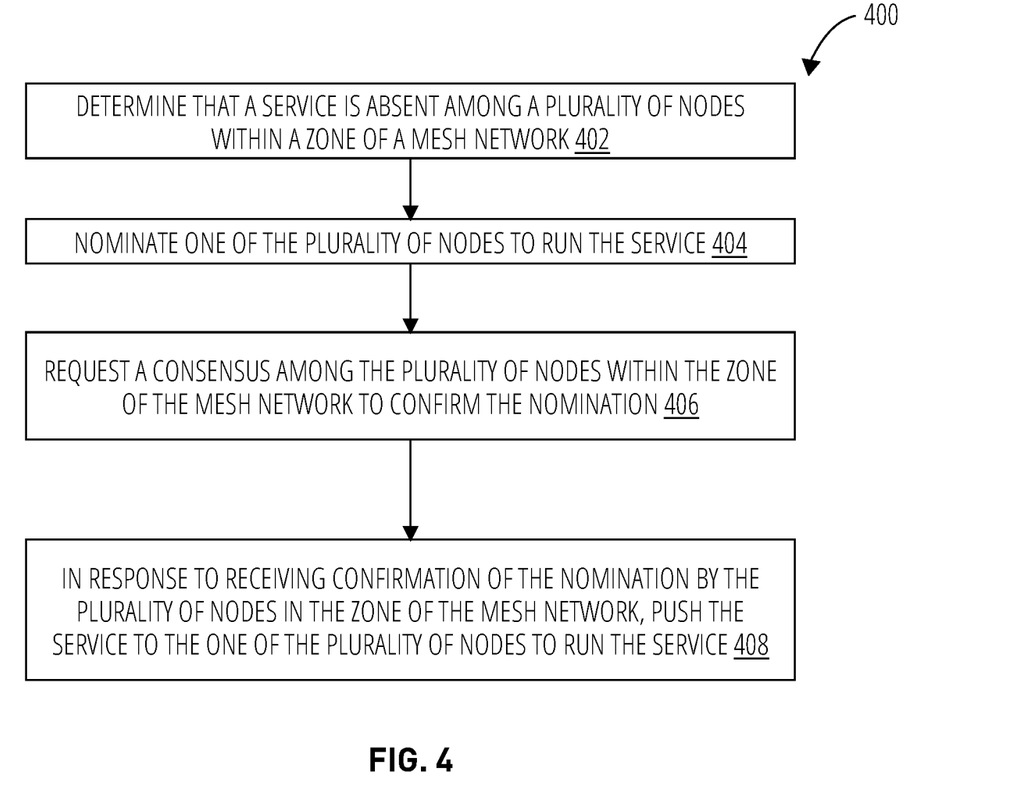
FIG. 4 illustrates an example method for consensus driven management of services in a mesh network, in accordance with one embodiment.

FIG. 4 illustrates an example method 400 for consensus driven management of services in a mesh network, in accordance with one embodiment. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. Processing logic may be integral to a node in a mesh network.

With reference to FIG. 4, method 400 illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in method 400 may be performed in an order different than presented, and that not all of the blocks in the method may be performed.

At block 402, processing logic may determine that a service is absent among a plurality of nodes within a zone of a mesh network. Additionally, or alternatively, processing logic may determine, even if the service is not absent, that another node is a better fit to run and offer the service to the mesh. Each of the nodes in the mesh network may access a service from another node, regardless of which zone either of the nodes are in. Further, each of the nodes in the mesh network may prioritize using the services offered to them in their zone, over the services in the mesh network outside of their zone.

At block 404, processing logic may nominate one of the plurality of nodes to run the service. As discussed, the nominated node may be selected based on a fit of the node to a service profile of that service. As discussed, a service profile may indicate desired attributes of a node such as CPU, processing speed, memory (e.g., RAM), network throughput, or other attributes that may be deemed to be sufficient or required to run a given service.

At block 406, processing logic may request a consensus among the plurality of nodes within the zone of the mesh network to confirm the nomination. For example, processing logic may communicate to each node in the zone, which node is nominated to perform a given service. Those nodes may each individually determine whether the nominated node is suitable for the given service. Suitability may be judged by each node in the same manner as described with reference to block 404. Those nodes may communicate with the remaining the nodes in the zone whether or not they agree with the nomination.

At block 408, processing logic may, in response to receiving confirmation of the nomination by the plurality of nodes in the zone of the mesh network, push the service to the one of the plurality of nodes to run the service. As described, processing logic may also request that a node drop a service, for example, when a more suitable node is nominated to run and offer the service, and a consensus is reached to confirm the nomination of that node. If a consensus is not reached by the nodes in the zone, then processing logic does not push the service to the nominated node. In some aspects, if a consensus is not reached, processing logic may repeat the process to nominate a different node or the same node. Processing logic may then request consensus of the nomination, again. This process may be repeated until a consensus is reached, a maximum number of consecutive nominations are made and rejected, or until the service gap is filled in that zone.

Figure 5:
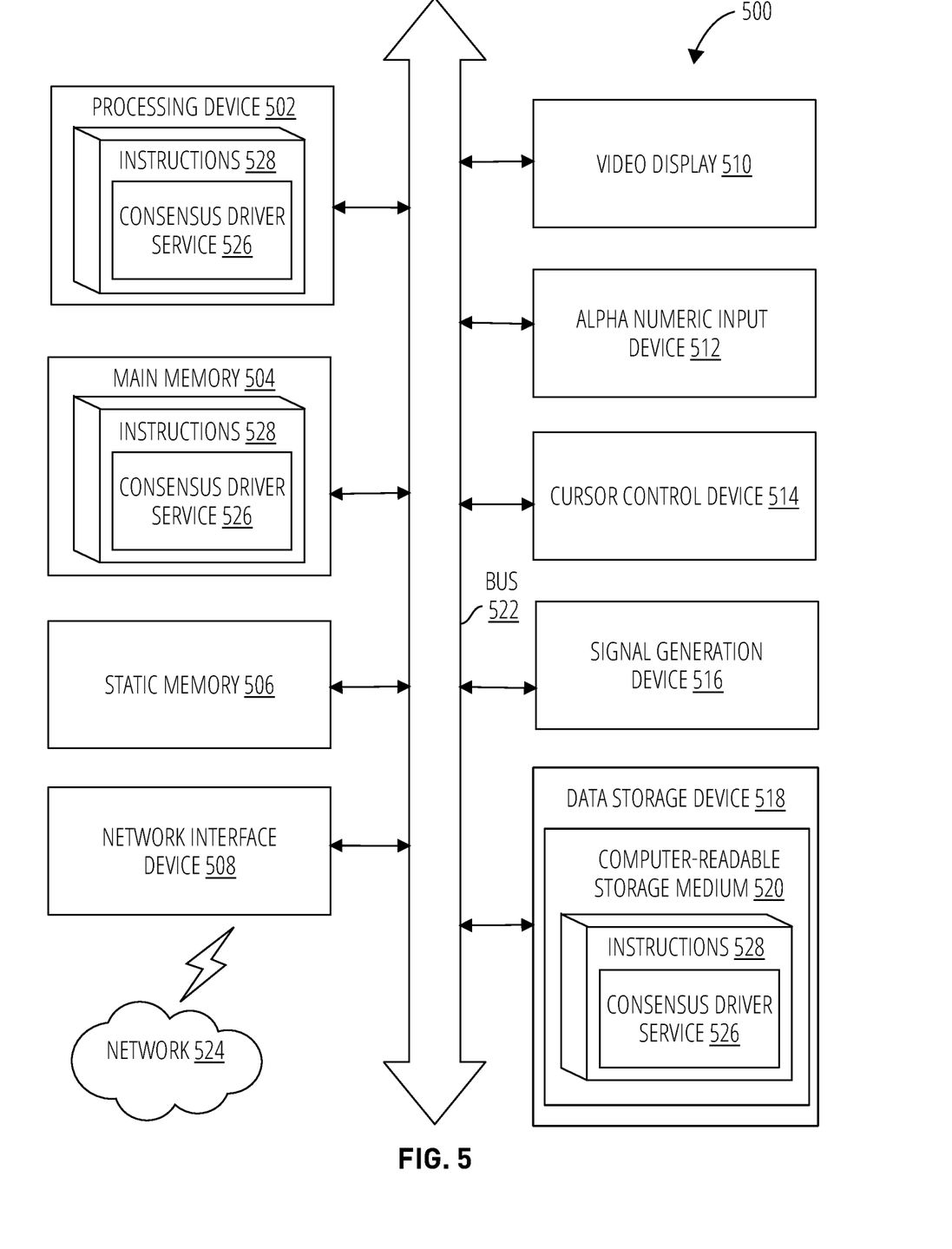
FIG. 5 is a block diagram of an example computing device that may perform one or more of the operations described herein, in accordance with some embodiments.

FIG. 5 is a block diagram of an example computing device 500 that may perform one or more of the operations described herein, in accordance with some embodiments. For example, the computing device may nominate a node to run a service in a given zone of a mesh network, and initiate a consensus among the nodes in this zone, to confirm the nomination.

Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 522.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 524. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 520 on which may be stored one or more sets of instructions 528 that may include instructions for a processing device (e.g., processing device 104), for carrying out the operations described herein, in accordance with one or more aspects of the present disclosure. Instructions 528 may also reside, completely or at least partially, within main memory 504 and/or within processing device 502 during execution thereof by computing device 500, main memory 504 and processing device 502 also constituting computer-readable media. The instructions 528 may further be transmitted or received over a network 524 via network interface device 508. The instructions 528 may contain instructions of a consensus driver service 526 that, when executed, perform the operations and steps discussed herein.

While computer-readable storage medium 520 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "sending", "storing", "obtaining", "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component may be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 110, sixth paragraph, for that unit/circuit/component. Additionally, "configured to" or "configurable to" may include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   determining, by a processing device, that a service is absent among a plurality of nodes within a zone of a mesh network;
   nominating, by the processing device, a second of the plurality of nodes to run the service;
   requesting, by the processing device, a consensus among the plurality of nodes within the zone of the mesh network to confirm nomination of the second of the plurality of nodes to:
      run the service in response to a new node entering the zone of the mesh network, or
      provide a second service in response to a first of the plurality of nodes that is currently running the second service satisfying a threshold; and
   in response to receiving confirmation of the nomination by a threshold amount of nodes agreeing to the nomination from the plurality of nodes in the zone of the mesh network, wherein the threshold amount is based on a majority of the nodes agreeing to the nomination, pushing, by the processing device, the service or the second service to the second of the plurality of nodes to run the service or the second service, wherein the service or the second service is accessible to each of the plurality of nodes within the zone and to a node outside the zone in the mesh network.

2. The method of claim 1, wherein determining that the service is not present within the zone of the mesh network includes polling, by the processing device, the plurality of nodes within the zone of the mesh network to determine which services, if any, are running on each of the plurality of nodes.

3. The method of claim 1, wherein determining, by the processing device, that the service is not present within the zone of the mesh network includes comparing a service manifest that includes a list of expected services within the zone to a list of services that are currently running on the plurality of nodes within the zone of the mesh network.

4. The method of claim 1, wherein the service is accessible to all nodes within the mesh network, and each of the plurality of nodes within the mesh network are configured to prioritize accessing services that are within its respective zone.

5. The method of claim 1, wherein the mesh network includes a plurality of zones that each have a geographical boundary within the mesh network.

6. The method of claim 1, wherein nominating the second of the plurality of nodes to provide the service is based on one or more criteria including at least one of: network throughput, a CPU load, RAM availability, and a number of services currently running on the one of the plurality of nodes.

7. The method of claim 6, wherein nominating the second of the plurality of nodes to provide the service includes comparing, by the processing device, the one or more criteria of each of the plurality of nodes within the zone of the mesh network to a service profile of the service.

8. The method of claim 7, wherein confirming nomination by the plurality of nodes includes determining, by each of the plurality of nodes, that the second of the plurality of nodes has the one or more criteria that fits the service profile, and communicating the confirmation with the plurality of nodes within the zone of the mesh network.

9. The method of claim 1, wherein each of the plurality of nodes updates a local service table to include that the one of the plurality of nodes is to run the service.

10. A system comprising:
a memory; and
a processing device operatively coupled to the memory, the processing device to:
determine that a service is absent among a plurality of nodes within a zone of a mesh network;
nominate a second of the plurality of nodes to run the service;
request a consensus among the plurality of nodes within the zone of the mesh network to confirm nomination of the second of the plurality of nodes to:
run the service in response to a new node entering the zone of the mesh network, or
provide a second service in response to a first of the plurality of nodes that is currently running the second service satisfying a threshold; and
in response to receiving confirmation of the nomination by a threshold amount of nodes agreeing to the nomination from the plurality of nodes in the zone of the mesh network, wherein the threshold amount is based on a majority of the nodes agreeing to the nomination, push the service or the second service to the second of the plurality of nodes to run the service or the second service, wherein the service or the second service is accessible to each of the plurality of nodes within the zone and to a node outside the zone in the mesh network.

11. The system of claim 10, wherein determining that the service is not present within the zone of the mesh network includes polling, by the processing device, the plurality of nodes within the zone of the mesh network to determine which services, if any, are running on each of the plurality of nodes.

12. The system of claim 10, wherein determining that the service is not present within the zone of the mesh network includes comparing a service manifest that includes a list of expected services within the zone, to a list of services that are currently running on the plurality of nodes within the zone of the mesh network.

13. A non-transitory computer-readable storage medium including instructions that, when executed by a processing device, cause the processing device to:
determine that a service is absent among a plurality of nodes within a zone of a mesh network;
nominate, by the processing device, a second of the plurality of nodes to run the service;
request a consensus among the plurality of nodes within the zone of the mesh network to confirm nomination of the second of the plurality of nodes to:
run the service in response to a new node entering the zone of the mesh network, or
provide a second service in response to a first of the plurality of nodes that is currently running the second service satisfying a threshold; and
in response to receiving confirmation of the nomination by a threshold amount of nodes agreeing to the nomination from the plurality of nodes in the zone of the mesh network, wherein the threshold amount is based on a majority of the nodes agreeing to the nomination, push the service or the second service to the second of the plurality of nodes to run the service or the second service, wherein the service or the second service is accessible to each of the plurality of nodes within the zone and to a node outside the zone in the mesh network.

14. The non-transitory computer-readable storage medium of claim 13, wherein determining that the service is not present within the zone of the mesh network includes polling, by the processing device, the plurality of nodes within the zone of the mesh network to determine which services, if any, are running on each of the plurality of nodes.

* * * * *